(12) United States Patent
Chen et al.

(10) Patent No.: US 11,525,026 B2
(45) Date of Patent: Dec. 13, 2022

(54) ADDITION AND CONDENSATION POLYMERS PREPARED FROM HALOGENATED REACTANTS

(71) Applicant: Arkema Inc., King of Prussia, PA (US)

(72) Inventors: Benjamin Bin Chen, Wayne, PA (US); Craig A. Polsz, Newtown, PA (US); Lucy Clarkson, Chadds Ford, PA (US)

(73) Assignee: Arkerna Inc., King of Prussia, PA (US)

( * ) Notice: Subject to any disclaimer, the term of this patent is extended or adjusted under 35 U.S.C. 154(b) by 77 days.

(21) Appl. No.: 16/651,397

(22) PCT Filed: Sep. 25, 2018

(86) PCT No.: PCT/US2018/052563
§ 371 (c)(1),
(2) Date: Mar. 27, 2020

(87) PCT Pub. No.: WO2019/067401
PCT Pub. Date: Apr. 4, 2019

(65) Prior Publication Data
US 2020/0299451 A1    Sep. 24, 2020

Related U.S. Application Data

(60) Provisional application No. 62/563,748, filed on Sep. 27, 2017.

(51) Int. Cl.
C08G 18/38 (2006.01)
C08L 87/00 (2006.01)
C08G 18/72 (2006.01)

(52) U.S. Cl.
CPC ..... *C08G 18/3802* (2013.01); *C08G 18/3804* (2013.01); *C08G 18/3806* (2013.01); *C08G 18/3812* (2013.01); *C08L 87/00* (2013.01); *C08G 18/72* (2013.01)

(58) Field of Classification Search
CPC ............ C08G 18/3802; C08G 18/3804; C08G 18/3806; C08G 18/3812
See application file for complete search history.

(56) References Cited

U.S. PATENT DOCUMENTS

| 3,935,277 | A | 1/1976 | Dear et al. | |
|---|---|---|---|---|
| 4,734,443 | A * | 3/1988 | Pawloski | C08G 18/2885 521/171 |
| 4,898,981 | A | 2/1990 | Falk et al. | |
| 6,423,809 | B1 * | 7/2002 | Vanpoulle | C03C 25/1065 427/508 |
| 2008/0182028 | A1 * | 7/2008 | Lu | C09D 11/30 427/466 |
| 2018/0022851 | A1 * | 1/2018 | Takao | C09D 175/16 522/39 |
| 2018/0346644 | A1 | 12/2018 | Guarda et al. | |

FOREIGN PATENT DOCUMENTS

| CN | 101831074 A1 | 9/2010 |
|---|---|---|
| CN | 104311756 A | 1/2015 |
| CN | 104311756 A | 1/2015 |
| CN | 104530408 A1 | 4/2015 |
| CN | 106117540 A1 | 11/2016 |

OTHER PUBLICATIONS

Journal of Fluorine Chemistry—Convenient Synthesis of 3,3,3 Trifluoropropanoic Acid by Hydrolytic Oxidation of 3,3,3,-Trifluorpropanal Dimethyl Acetal; Takeo Komata et al Journal of Flourine 129 (2008) 35-39.
A Novel & Convenient Synthesis of (Z)-3,3,3-Trufluoroproenyl Alkyl Ethers & CF3-Substituted Propyl Acetals as Versatile CF3-Containg Building Blocks Chem Comm 1996; Feng Hong et al.—Shanghai Inst of Organic Chemisty pp. 57-58.

\* cited by examiner

*Primary Examiner* — Michael L Leonard
(74) *Attorney, Agent, or Firm* — Steven D. Boyd

(57) ABSTRACT

Polymers containing halogen functionality are prepared by the addition or condensation polymerization of at least one halogenated reactant containing at least two active hydrogen-containing functional groups per molecule and at least one halogenated heteroalkyl or halogenated heteroalkenyl group per molecule and at least one co-reactant containing at least two functional groups reactive with the active hydrogen groups of the at least one halogenated reactant.

18 Claims, No Drawings

ADDITION AND CONDENSATION POLYMERS PREPARED FROM HALOGENATED REACTANTS

This present application is the national phase under 35 USC § 371 of prior PCT International Application Number PCT/US2018/052563 filed Sep. 25, 2018 which designated the United States of America and claimed priority to U.S. Provisional Patent Application Ser. No. 62/563,748 filed Sep. 27, 2017.

FIELD OF THE INVENTION

The present invention relates to addition and condensation polymers based on halogenated reactants which are reacted with co-reactants, methods for making such polymers, and end-use applications for such polymers.

BACKGROUND OF THE INVENTION

Addition and condensation polymers such as polyamides, polyesters and polyurethanes have been well known for many years. However, the possible modification of such polymers to alter their properties and attributes and to make them better suited for particular end use applications continues to be of great interest. The introduction of halogen atoms or halogenated functional groups, in particular fluorine atoms or fluorinated functional groups, into these types of polymers, particularly in targeted ways (i.e., placing one or more halogen atoms at specific locations in the polymer chain), would permit the development of improved polymers for certain uses. However, synthetic methods for making such halogen-functionalized addition and condensation polymerization products have to date been somewhat limited.

BRIEF SUMMARY OF THE INVENTION

According to one aspect of the invention, at least one halogenated reactant comprising a) at least two active hydrogen-containing functional groups and at least one halogenated heteroalkyl or halogenated heteroalkenyl group and b) at least one co-reactant comprising at least two functional groups reactive with the active hydrogen groups of the at least one halogenated reactant are reacted to obtain a polymer. The polymers thus obtained have useful and advantageous properties as compared to analogous non-halogen-containing polymers as a consequence of the incorporation of halogenated heteroalkyl and/or halogenated heteroalkenyl groups into the polymer.

DETAILED DESCRIPTION OF CERTAIN EMBODIMENTS OF THE INVENTION

Types of Polymers

In accordance with the present invention, polymers are provided which are addition or condensation polymerization products of reactants comprising, consisting essentially of or consisting of:
  a) at least one halogenated reactant comprising at least two active hydrogen-containing functional groups and at least one halogenated heteroalkyl or halogenated heteroalkenyl group; and
  b) at least one co-reactant comprising at least two functional groups reactive with the active hydrogen-containing functional groups of the at least one halogenated reactant.

The at least one halogenated reactant may be considered to function as a chain-extending monomer which provides pendant halogenated functionality to condensation and addition polymers. That is, the halogenated heteroalkyl group or halogenated heteroalkenyl group becomes incorporated in a polymer chain, through reaction with the co-reactant(s), in such a way so as to position halogenated substituents derived from the halogenated heteroalkyl group or halogenated heteroalkenyl group pendant to the backbone (main chain) of the polymer. Thus, the halogenated heteroalkyl or heteroalkenyl groups appear as side chains on the polymer backbone.

Different types of polymers are contemplated by the present invention, as determined by the selection of the particular halogenated reactants(s) and co-reactant(s) which are reacted with each other. For example, where the active hydrogen-containing functional groups of the halogenated reactant are hydroxyl groups and the functional groups of the co-reactant are isocyanate groups, a polyurethane is obtained. Reacting a halogenated reactant containing amino groups with a co-reactant bearing isocyanate functional groups yields a polyurea. If the halogenated reactant contains hydroxyl groups and the co-reactant contains carboxylic acid groups, anhydride groups, carboxylate groups, or acyl halide groups, a polyester is produced. Polyamides may be produced by reacting a halogenated reactant containing amino functional groups with dicarboxylic acid-functionalized co-reactants. Additionally, a cured epoxy resin (epoxy polymer) may be formed by reacting a halogenated reactant comprising hydroxyl groups, secondary amino groups or primary amino groups with an epoxy resin.

An addition polymerization is a polymerization in which monomers react in a way so as to build a polymer chain through linking of the reacted monomers, without the loss of any fragments of the monomers and without the production of any low molecular weight products. The reaction of a dihydroxyl-functional halogenated reactant with a polyisocyanate is an example of an addition polymerization. In contrast, during condensation polymerization, coproducts derived the monomers are generated as a result of the reaction between monomer molecules. A condensation polymerization may be exemplified by the reaction of a dihydroxyl-functional halogenated reactant with a dicarboxylic acid-functionalized co-reactant to form a polyester, with water being generated as a byproduct of the monomer condensation.

The polymers in accordance with the present invention may have any suitable structure, such as linear, branched or crosslinked, with the structure being controllable through selection of the particular halogenated reactant(s) and co-reactant(s) employed in the addition or condensation polymerization. For example, if both the halogenated reactant component and the co-reactant component are difunctional (e.g., if a halogenated reactant containing two active hydrogen-containing functional groups such as hydroxyl groups is reacted with a co-reactant containing two functional groups, such as carboxylic acid groups, reactive with the active hydrogen-containing functional groups of the halogenated reactant), a linear polymer may be obtained. If one or both of the halogenated reactant and the co-reactant contain three or more such functional groups per molecule, then the resulting polymer will generally be branched or crosslinked.

Polymers of higher molecular weight in accordance with the present invention may be thermoplastic or thermoset in nature, again depending upon the particular halogenated reactant(s) and co-reactant(s) utilized in the preparation of the polymer. The polymer may be elastomeric. Polymers which are liquid at room temperature are also possible, particularly if the addition or condensation polymerization is not carried out to a relatively high molecular weight. The molecular weight of polymers in accordance with the present invention is not considered particularly limited. For example, polymers having number average molecular weights of from 1000 to 1,000,000 g/mol (daltons) or more as determined by gel permeation chromatography using polystyrene standards may be prepared, with the molecular weight being controllable by the reaction conditions, the use of chain termination agents, and other such techniques known in the addition and condensation polymerization art.

Halogenated Reactants

The polymers of the present invention comprise, in polymerized form, one or more halogenated reactants comprising at least two active hydrogen-containing functional groups per molecule and at least one halogenated heteroalkyl or halogenated heteroalkenyl group per molecule. That is, the polymer comprises one or more repeating units derived from such halogenated reactants as a consequence of the addition or condensation polymerization of such halogenated reactants with one or more co-reactants comprising at least two functional groups per molecule which are reactive with the active hydrogen groups of the halogenated reactant(s). Incorporation of the halogenated reactant(s) introduces halogenation into the addition or condensation polymer thereby formed. In one embodiment, such halogenation appears at least in the form of side chains pendant to the backbone or main chain of the polymer. Such side chains may, for example, have a molecular weight of not more than 900 daltons, not more than 800 daltons, or not more than 700 daltons. The molecular weight of the side chains may be, for example, not less than 88 daltons. The side chains may comprise, for example, the halogenated heteroalkyl group(s) or halogenated heteroalkenyl group(s) present in the halogenated reactant(s) used to prepare the polymer.

As used herein, the term "halogenated heteroalkyl group" refers to a moiety, typically a monovalent moiety, containing a saturated aliphatic segment that is partially or fully halogenated wherein a carbon atom of the saturated aliphatic segment is substituted with a heteroatom, in particular O, S or N, that is bonded to a carbon atom which is not part of the halogenated heteroalkyl group (thereby forming a C—C—O—C, C—C—S—C or C—C—N—C linkage). The term "halogenated heteroalkenyl group" refers to a moiety, typically a monovalent moiety, containing an unsaturated aliphatic segment (an aliphatic segment containing at least one site of ethylenic unsaturation, i.e., a C═C structure) that is partially or fully halogenated wherein a carbon atom of the unsaturated aliphatic segment is substituted with a heteroatom, in particular O, S or N, that is bonded to a carbon atom which is not part of the halogenated heteroalkenyl group (thereby forming a C═C—O—C, C═C—S—C or C═C—N—C linkage). As used herein, the term "halogenated" means that one or more hydrogen atoms substituted on a carbon atom have been substituted with a halogen atom (e.g., F, Cl, Br or I, particularly F or Cl). Where a halogenated group contains two or more carbon atoms, one or more hydrogen atoms substituted on one or more carbon atoms are substituted with a halogen atom. Different halogen atoms may be present in the halogenated heteroalkyl group or halogenated heteroalkenyl group (e.g., both F and Cl atoms). In other embodiments, the halogenated heteroalkyl group or halogenated heteroalkenyl group contains a single type of halogen (e.g., F only or Cl only).

For example, the halogenated heteroalkyl group may correspond to formula (I):

$$CX^1X^2HCX^3X^4—Y—\qquad(I)$$

wherein $X^1$, $X^2$, $X^3$ and $X^4$ are independently selected from a hydrogen atom, a halogen atom or a halogenated or non-halogenated alkyl group having 1 to 20 carbon atoms, and Y is oxygen (O), sulfur (S) or NR, where R is H or an organic moiety (e.g., alkyl, such as C1-C6 alkyl), subject to the proviso that the halogenated heteroalkyl group is comprised of at least one halogen atom. In one embodiment, Y is oxygen (O). In another embodiment, the halogenated heteroalkyl group is comprised of at least one fluorine atom (i.e., at least one of $X^1$, $X^2$, $X^3$ or $X^4$ is F or a fluorinated alkyl group). In still further embodiments, the halogenated heteroalkyl group is comprised of from 2 to 4 carbon atoms.

The halogenated heteroalkenyl group may, for example, correspond to formula (IA):

$$CX^1X^2═CX^3—Y—\qquad(IA)$$

wherein $X^1$, $X^2$ and $X^3$ are independently selected from a hydrogen atom, a halogen atom or a halogenated or non-halogenated alkyl group having 1 to 20 carbon atoms, and Y is oxygen (O), sulfur (S) or NR, where R is H or an organic moiety (e.g., alkyl, such as C1-C6 alkyl), subject to the proviso that the halogenated heteroalkenyl group is comprised of at least one halogen atom. In one embodiment, Y is oxygen (O). In another embodiment, the halogenated heteroalkenyl group is comprised of at least one fluorine atom (i.e., at least one of $X^1$, $X^2$ or $X^3$ is F or a fluorinated alkyl group). In still further embodiments, the halogenated heteroalkenyl group is comprised of from 2 to 4 carbon atoms.

In further embodiments of the invention, the halogenated reactant may correspond to formula (II):

$$(R^1—Y—)_xR^2(YH)_y\qquad(II)$$

wherein $R^1$ is a halogenated alkyl or halogenated alkenyl group, $R^2$ is an organic moiety, x is an integer of 1 or more and y is an integer of 2 or more. In certain embodiments, $R^1$ comprises at least one fluorine atom. In other embodiments, $R^1$ in formula (II) corresponds to formula (III):

$$CX^1X^2HCX^3X^4—\qquad(III)$$

wherein $X^1$, $X^2$, $X^3$ and $X^4$ are independently selected from a hydrogen atom, a halogen atom or a halogenated or non-halogenated alkyl group having 1 to 20 carbon atoms, subject to the proviso that at least one of $X^1$, $X^2$, $X^3$ or $X^4$ is halogen or a halogenated alkyl group. The total of x+y may be an integer of from 3 to 6, for example. According to certain embodiments, x is 1 and y is 2. Y is oxygen (O) in other embodiments of the invention. $R^2$ may be, for example, a trivalent C3-C20 aliphatic moiety, such as —CH₂—CH(-)—CH₂—. According to various embodiments of the invention, x is 1, y is 2, Y is oxygen (O), and $R^2$ is a trivalent C3-C20 aliphatic moiety (e.g., —CH₂—CH(-)—CH₂—).

Halogenated reactants suitable for use in the present invention may be prepared using the synthetic methods described in the provisional United States application being filed concurrently herewith under Attorney Docket No. IR 4328, the disclosure of which is incorporated herein by reference in its entirety for all purposes. Such synthetic methods may be summarized as follows.

The halogenated reactant may be made by a process comprising reacting an active hydrogen-containing organic compound selected from the group consisting of alcohols, primary amines, secondary amines and thiols with a halogenated olefin containing a carbon-carbon double bond, wherein at least one carbon of the carbon-carbon double bond is substituted with at least one of a halogen or a halogenated alkyl group. The halogenated olefin may contain one, two, three, four or more halogen atoms, which may be the same as or different from each other (e.g., F only, Cl only or both F and Cl). The halogenated olefin may have a halogenated alkyl group (e.g., a fluorinated alkyl group) substituted on one carbon of the carbon-carbon double bond. For example, the halogenated olefin may have a perfluorinated alkyl group substituted on one carbon of the carbon-carbon double bond.

According to certain aspects, the halogenated olefin may have a structure in accordance with formula (4):

$$CX^1X^2\!\!=\!\!CX^3X^4 \tag{4}$$

wherein $X^1$, $X^2$, $X^3$ and $X^4$ are independently selected from the group consisting of hydrogen (H), chlorine (Cl), fluorine (F), bromine (Br), iodine (I) and halogenated and non-halogenated C1-C20 alkyl groups, subject to the provisos that one or more of $X^1$, $X^2$, $X^3$ and $X^4$ are halogens selected from the group consisting of chlorine (Cl), fluorine (F), bromine (Br) and iodine (I) and, when one of $X^1$, $X^2$, $X^3$ or $X^4$ is halogen and each of the other $X^1$, $X^2$, $X^3$ and $X^4$ substituents is a substituent other than halogen, the halogenated olefin contains at least one halogenated alkyl group. In other aspects, at least one of $X^1$, $X^2$, $X^3$ or $X^4$ is Cl and the halogenated olefin additionally contains one, two, three, four or more fluorine atoms.

Suitable exemplary halogenated olefins may be selected from the group consisting of  CClF=CH$_2$, CH$_2$=CF$_2$, CFH=CH$_2$, CF$_2$=CHF, CF$_3$CF=CH$_2$, CF$_2$=CF$_2$, CH$_2$=CHC$_1$, CHC$_1$=CHC$_1$, CH$_2$=CCl$_2$, CF$_2$=CFC$_1$; CF$_2$=CHC$_1$, CF$_3$CC$_1$=CH$_2$, CF$_3$CCl=CClH, CF$_3$CH=CCl$_2$, CF$_3$CF=CCl$_2$, CF$_3$CF=CClH, CF$_3$CCl=CFH, CF$_3$CCl=CF$_2$, CF$_3$CCl=CFC$_1$, CF$_3$CF=CFCl, CF$_3$CH=CHCl, CF$_3$CF=CFH, CF$_3$CH=CF$_2$, CF$_3$CF=CF$_2$, CF$_3$CH$_2$CF=CH$_2$, CF$_3$CH=CFCH$_3$, CF$_3$CF=CHCF$_3$, CF$_3$CCl=CHCF$_3$, CF$_2$HCH$_2$CF=CH$_2$, CF$_2$HCH$_2$CF=CHCl and CF$_2$HCH=CFCH$_2$Cl.

According to certain aspects, the halogenated olefin may be reacted with an aliphatic polyalcohol. In other aspects, the halogenated olefin is reacted with a masked aliphatic polyalcohol which is an aliphatic polyol having a plurality of hydroxyl groups wherein at least one hydroxyl group is blocked and at least one hydroxyl group is a free hydroxyl group.

According to certain aspects, the reaction of the active hydrogen-containing organic compound with the halogenated olefin may be carried out under basic conditions, for example in the presence of an inorganic base such as an alkali metal hydroxide or an alkali metal salt of carbonic acid. The reaction may be carried out in a liquid medium, for example a liquid medium comprised of one or more organic solvents, in particular polar, non-protic organic solvents. The reaction may be carried out in the presence of a phase transfer catalyst.

In accordance with certain aspects, the active hydrogen-containing organic compound and the halogenated olefin may be reacted at a temperature of from about 25° C. to about 200° C. or from about 50° C. to about 120° C. for a time of from about 0.5 hours to about 24 hours. The active hydrogen-containing organic compound and the halogenated olefin may be reacted in a stoichiometric ratio of (moles active hydrogen-containing organic compound)/x: moles halogenated olefin, wherein x=number of active hydrogens per molecule of the active hydrogen-containing organic compound, of from about 1:8 to about 8:1.

To prepare the halogenated reactant, a halogenated olefin (for example, a fluorinated olefin) may be employed as a reactant. As used herein, the term "halogenated olefin" refers to an organic compound containing at least one carbon-carbon double bond and at least one halogen atom (Cl, F, Br, I). As used herein, the term "fluorinated olefin" refers to an organic compound containing at least one carbon-carbon double bond and at least one fluorine atom (and optionally one or more halogen atoms other than fluorine).

The halogenated olefin may contain one, two, three or more halogen atoms, such as bromine, chlorine, fluorine or iodine atoms or combinations thereof (e.g., at least one fluorine atom and at least one chlorine atom). In certain embodiments, the halogenated olefin contains at least one halogen atom substituted on at least one of the carbon atoms involved in a carbon-carbon double bond present in the halogenated olefin. Suitable fluorinated olefins include olefins containing one, two, three or more fluorine (F) atoms. The fluorine atom(s) may be substituted on one or both of the carbon atoms involved in a carbon-carbon double bond and/or may be present as a substituent on a moiety, such as an alkyl group, that is attached to one or both of the carbon atoms involved in a carbon-carbon double bond. For example, the fluorinated olefin may comprise one or more fluoroalkyl (e.g., perfluoroalkyl) groups, such as fluoromethyl, difluoromethyl, trifluoromethyl, fluoroethyl, difluoroethyl, trifluoroethyl, tetrafluoroethyl, perfluoroethyl, fluoropropyl, difluoropropyl, trifluoropropyl, tetrafluoropropyl, pentafluoropropyl, hexafluoropropyl, perfluoropropyl and the like and analogues thereof wherein wherein a portion of the fluorine atoms and/or one or more of the hydrogen atoms are replaced with other halogen atoms (e.g., Cl). The fluorinated olefin may comprise one or more halogen atoms other than fluorine, in particular one or more chlorine (Cl), iodine (I) and/or bromine (Br) atoms. In certain embodiments, the halogenated olefin or fluorinated olefin may comprise at least one chlorine atom substituted on a carbon atom involved in a carbon-carbon double bond. In further embodiments of the invention, the halogenated olefin or fluorinated olefin may comprise at least one hydrogen atom substituted on a carbon atom involved in a carbon-carbon double bond. For example, fluoroolefins, hydrofluoroolefins, chloroolefins, hydrochloroolefins, chlorofluoroolefins, and hydrochlorofluoroolefins may all be employed as the halogenated olefin reactant in the present invention. Suitable types of fluorinated olefins include fluoroethylenes, chlorofluoroethylenes, fluoropropenes, chlorofluoropropenes, fluorobutenes, chlorofluorobutenes, fluoropentenes, chlorofluoropentenes, fluorohexenes, chlorofluorohexenes and the like. In various embodiments of the invention, the halogenated olefin comprises two, three, four, five, six or more carbon atoms, e.g., 2-20 carbon atoms, 2-8 carbon atoms, 2-6 carbon atoms or 2-4 carbon atoms.

According to certain aspects, the halogenated olefin may have a structure in accordance with formula (4):

$$CX^1X^2\!\!=\!\!CX^3X^4 \tag{4}$$

wherein $X^1$, $X^2$, $X^3$ and $X^4$ are independently selected from the group consisting of hydrogen (H), chlorine (Cl), fluorine (F), bromine (Br), iodine (I) and halogenated and non-halogenated C1-C20 alkyl groups, wherein at least one of $X^1$, $X^2$, $X^3$ or $X^4$ is halogen or a halogenated alkyl group (e.g., a fluorinated alkyl group such as trifluoromethyl).

Specific representative examples of halogenated olefins suitable for use in preparing the halogenated reactant include, but are not limited to:

 CClF=CH$_2$

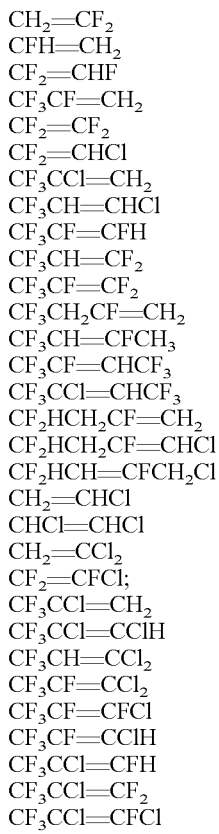

All possible isomers (e.g., E or Z isomers) of the above-mentioned halogenated olefins can be used.

In one embodiment, a chloro-substituted trifluoropropenyl compound is employed as the halogenated olefin. Suitable chloro-substituted trifluoropropenyl compounds include 1-chloro-3,3,3-trifluoro-prop-1-ene (also known as 1233zd) and 2-chloro-3,3,3-trifluoroprop-1-ene. Either the cis or trans isomer of 1-chloro-3,3,3-trifluoro-prop-1-ene may be used (i.e., trans-(E)-1233zd or cis-(Z)-1233zd).

The active hydrogen-containing organic compound utilized in the preparation of the halogenated reactant may be selected from the group consisting of alcohols, primary amines, secondary amines, and thiols. The active hydrogen-containing organic compound may comprise one or more active hydrogens per molecule (e.g., one, two, three, four, five or more active hydrogens per molecule). Such active hydrogens may be in the form of hydroxyl groups (—OH), thiol groups (—SH) and/or primary or secondary amine groups (—NH$_2$ or —NH—, wherein each open bond is to a carbon atom). It is understood that under certain reaction conditions (for example, when the reaction is catalyzed or promoted by a base), the active hydrogen-containing organic compound may be present in deprotonated or partially deprotonated form (e.g., —O$^-$, —S$^-$). The active hydrogen-containing organic compound may be monomeric, oligomeric or polymeric. There is no particular known restriction with respect to the number of carbon atoms which may be present in the active hydrogen-containing organic compound, but in various embodiments of the invention the active hydrogen-containing organic compound may be comprised of from 1 to 30 or from 2 to 20 carbon atoms.

The term "alcohol" refers to any organic compound bearing at least one hydroxyl group (—OH) substituted on an organic moiety. The term "thiol" refers to any organic compound bearing at least one thiol group (—SH) substituted on an organic moiety. The term "primary amine" refers to any organic compound bearing at least one —NH$_2$ group substituted on an organic moiety. The term "secondary amine" refers to any organic compound containing, as a substituent on an organic moiety or as part of a cyclic organic structure, at least one —NH— group (wherein the nitrogen atom is bonded to two carbon atoms).

The organic moiety portion of the active hydrogen-containing organic compound is not limited and may be, for example, an optionally substituted alkyl group, an optionally substituted heteroalkyl group, an optionally substituted alkylene group, an optionally substituted heteroalkenyl group, an optionally substituted aryl group, an optionally substituted heteroaryl group, an optionally substituted cycloalkyl group, or an optionally substituted heterocycloalkyl group. Suitable optional substituents include, for example, halogen, cyano, nitro, alkoxy, carboxyl and the like.

In certain embodiments, the active hydrogen-containing organic compound corresponds to the general structure Q(YH)$_x$, wherein Q is a substituted or unsubstituted organic moiety (e.g., alkyl, heteroalkyl, cycloalkyl, heterocycloalkyl, aryl, heteroaryl and substituted variants thereof), Y is O, S or NR (where R is H or a substituted or unsubstituted organic moiety, such as an optionally substituted alkyl group), and x is an integer of 1 or more (e.g., 1-10, 1-5 or 1-3). In such compounds, the oxygen, sulfur or nitrogen atom of each Y moiety is bonded to a carbon atom of Q. Where x is an integer of 2 or more, the Y moieties may be the same as or different from each other. Q may be a monomeric organic moiety or, in other embodiments of the invention, may be an oligomeric or even polymeric organic moiety (containing two or more repeating units of a monomeric residue, such as oxyethylene).

In other embodiments, the active hydrogen-containing organic compound may be an aliphatic polyalcohol, in particular, an aliphatic alcohol containing three or more hydroxyl groups per molecule (e.g., three to six hydroxyl groups per molecule). By controlling the reaction conditions (e.g., the stoichiometry of the aliphatic polyalcohol and the halogenated olefin), only a portion of the hydroxyl groups may be reacted such that a reaction product is obtained containing two or more unreacted hydroxyl groups per molecule which is suitable for use as a halogenated reactant in accordance with the present invention. Examples of suitable aliphatic polyalcohols include, but are not limited to, C$_3$-C$_{18}$ aliphatic triols, sugar alcohols, glycerol, trihydroxybutanes, trihydroxypentanes, trihydroxyhexanes, pentaerythritol, trimethylolpropane, trimethylolpropane, dipentaerythritol and alkoxylated derivatives thereof (e.g., where any of the aforementioned aliphatic polyalcohols has been reacted with from 1 to 750 (e.g., 1 to 30) moles of an alkylene oxide such as ethylene oxide and/or propylene oxide per mole of aliphatic polyalcohol).

According to other aspects, the active hydrogen-containing organic compound may contain three or more active hydrogen-containing functional groups, wherein at least two active hydrogen-containing functional groups are masked/blocked and at least one active hydrogen-containing functional group remains in unprotected form and can participate in the desired reaction with a halogenated olefin. Following such reaction, the masked/blocked active hydrogen-containing functional group(s) can be optionally deprotected, thereby generating at least two active hydrogen-containing functional groups. The resulting halogenated reactant comprising a) at least two active hydrogen-containing functional groups and at least one halogenated heteroalkyl or halogenated heteroalkenyl group can then be polymerized together with co-reactant(s) in accordance with the present invention to yield the desired addition and condensation polymers.

Non-limiting examples of masked/blocked polyols useful for producing halogenated reactants capable of being employed to make addition and condensation polymers in accordance with the present invention include compounds such as (2,2-dimethyl-1,3-dioxolan-4-yl)methanol (also known as solketal), 4-hydroxymethyl-1,3-dioxolan-2-one (also known as glycerin carbonate), trimethylol propane ketal, trimethylol propane carbonate, and the like such as ketals and carbonates of other aliphatic triols such as trimethylolethane, butanetriols, pentanetriols, hexanetriols and the like.

In particular embodiments, an aliphatic polyalcohol is employed in which two or more of the hydroxyl groups are masked or blocked, with one or more of the hydroxyl groups remaining free for reaction with halogenated olefin. Once the blocked/masked polyalcohol has been reacted with the halogenated olefin, the blocking/masking group(s) (sometimes also referred to as protecting groups) may be optionally removed so as to generate a co-reactant containing two or more free hydroxyl groups. Any of the blocking or masking reagents or techniques known in the field of organic chemistry to be suitable for masking hydroxyl groups may be employed. Typically, however, it will be desirable to employ a blocking or masking group that remains stable (i.e., is not removed to any significant extent) under the conditions used to react the masked aliphatic polyalcohol with the halogenated olefin. For example, if a basic catalyst is employed during the masked aliphatic polyalcohol/halogenated olefin reaction, the blocking/masking group(s) should be resistant to deblocking or demasking under such basic conditions. Illustrative examples of suitable blocking/masking groups include, but are not limited to, silyl ether groups, acetal groups, ketal groups, benzyl groups and the like. Solketal is a particular example of a blocked/masked aliphatic polyalcohol, wherein two hydroxyl groups of glycerol are blocked through a ketal group, with the other hydroxyl group being free to react with a halogenated olefin. Alternatively, two hydroxyl groups of glycerol may be blocked through a carbonate group to yield glycerin carbonate, which has one hydroxyl group which is free to react with a halogenated olefin. Other examples of suitable protecting groups for hydroxyl functional groups include, but are not limited to, acetyl (Ac), benzoyl (Bz), beta-methoxyethoxymethylether (MEM), dimethoxytrityl (DMT), methoxymethyl ether (MOM), methoxytrityl (MMT), p-methoxybenzyl ether (PMB), methylthiomethyl ether, pivaloyl (Piv), tetrahydropyranyl (THP), tetrahydrofuryl (THF), trityl (triphenylmethyl, Tr), silyl ether, methyl ether, t-butyl ether and ethoxyethyl ether (EE).

Similarly, other types of active hydrogen-containing functional groups (e.g., thiol groups, primary amine groups, secondary amine groups) which may be present in the active hydrogen-containing compound employed in the preparation of the halogenated reactant may be masked or blocked using any of the masking/blocking techniques known in the art. One or more non-blocked active hydrogen-containing functional groups which are still present may then be reacted with the halogenated olefin to obtain a halogenated intermediate, which may then be de-blocked (unmasked) to provide two or more active hydrogen-containing functional groups (which are then available to react with a co-reactant in accordance with the present invention to form an addition or condensation polymer). Suitable amine protecting groups include, for example, carbobenzyloxy (Cbz) groups, p-methoxybenzyl carbonyl (Moz or MeOZ) groups, tert-butyloxycarbonyl (BOC) groups, 9-fluorenylmethyloxycarbonyl (FMOC) groups), acetyl (Ac) groups, benzoyl (Bz) groups, benzyl (Bn) groups, carbamate groups, p-methoxybenzyl (PMB) groups, 3,4-dimethoxybenzyl (DMPM) groups, p-methoxyphenyl (PMP) groups, tosyl (Ts) groups, trichloroethyl chloroformate (Troc) groups, sulfonamide (e.g., Nosyl and Nps) groups and the like.

Following reaction with a halogenated olefin, one or more of the active hydrogens of the active hydrogen-containing organic compound (i.e., one or more of the hydrogens in one or more of the —YH moieties) is replaced by an alkenyl or alkyl group (e.g., —CF=CH$_2$, —CF$_2$CFHCF$_3$, —CF$_2$CFClH. —CF$_2$CClH$_2$, —CF$_2$CF$_2$H, —CH=CHCF$_3$ or —C(CF$_3$)=CH$_2$). Without wishing to be bound by theory, it is believed that the reaction of the present invention proceeds by addition of the active hydrogen-containing functional group of the active hydrogen-containing organic compound across the double bond of the halogenated olefin. Such reaction forms a halogenated alkyl group (i.e., the halogenated olefin is converted to a halogenated alkyl group which is present within the product formed). Typically, the heteroatom of the active hydrogen-containing functional group (e.g., the oxygen atom of a hydroxyl group) becomes preferably bonded to the more "halogen heavy" carbon atom of the carbons involved in the carbon-carbon double bond of the halogenated olefin (i.e., the carbon having the greatest number of halogen atoms bonded to it). In certain cases, mixtures of different products are obtained, wherein the heteroatom of the active hydrogen-containing functional group becomes bonded to each of the carbon atoms involved in the carbon-carbon double bond. An alkenyl group results from elimination of hydrohalide from the halogenated alkyl group. Such elimination may be favored by increasing the basicity of the reaction medium.

The aforementioned transformations may be generically illustrated as follows, wherein an alcohol is reacted with a halogenated olefin.

Initial reaction: R-OH+ZXC=CZ$_2$→(R—O—)ZXC—CHZ$_2$

Elimination: (R—O—)ZXC—CHZ$_2$→(R—O—)ZC=CZ$_2$+HX

R=organic moiety (e.g., alkyl)

X=halogen (e.g., F, Cl)

Z=hydrogen, halogenated or non-halogenated organic moiety, halogen

Specific examples of halogenated reactants useful in the present invention and capable of being produced in accordance with the above-described synthetic methods include, but are not limited to, halogenated reactants which are the deblocked reaction products of an active hydrogen-containing organic compound selected from the group consisting of solketal and glycerin carbonate with a halogenated olefin selected from the group consisting of CF$_2$=CH$_2$, CFCl=CH$_2$, CF$_2$=CHCl, CF$_2$=CFCl, CF$_2$=CF$_2$, CF$_3$CF=CF$_2$, CF$_3$CF=CH$_2$, CF$_3$CH=CFH, CF$_3$CCl=CH$_2$, and CF$_3$CH=CHCl, wherein the ketal or carbonate blocking group has been removed to provide a halogenated reactant containing two hydroxyl groups per molecule.

Where the active hydrogen-containing organic compound contains three or more active hydrogen-containing functional groups per molecule (e.g., where the active hydrogen-containing organic compound is an aliphatic polyalcohol) and it is desired to obtain a product, following reaction with a halogenated olefin, that contains two or more free (unreacted) active hydrogen-containing functional groups per molecule, it will generally be desirable to employ a stoichiometric excess of the active hydrogen-containing organic compound relative to the halogenated olefin so as to favor the production of such a product over products wherein fewer than two active hydrogen-containing functional groups remain unreacted. In such cases, the active hydrogen-containing organic compound and the halogenated olefin may be reacted in a stoichiometric ratio of (moles active hydrogen-containing organic compound)/x: moles halogenated olefin, wherein x=number of active hydrogens per molecule of the active hydrogen-containing organic compound, of from about 1:1 to about 12:1, about 1.5:1 to about 10:1 or about 2:1 to about 8:1.

Co-Reactants

Co-reactants useful in the present invention may generally be selected based on the type of reactive functional group(s) present in the halogenated reactant as well as the type and composition of the polymer which is the desired product of the addition or condensation polymerization reaction taking place between the halogenated reactant(s) and the co-reactant(s). The co-reactant should comprise at least two functional groups reactive with the active hydrogen groups of the at least one halogenated reactant (i.e., the co-reactant should contain at least two active hydrogen-reactive functional groups). The co-reactant may, for example, comprise at least two functional groups selected from the group consisting of isocyanate groups, epoxy groups, carboxylic acid groups, carboxylate groups, anhydride groups, and acyl halide groups.

Illustrative examples of co-reactants which may be employed in the present invention include, but are not limited to, polyisocyanates, polyisocyanate-functionalized urethane prepolymers, polycarboxylic acids, and epoxy resins.

Suitable polyisocyanates include organic compounds containing two or more isocyanate functional groups (—NCO) per molecule. As used herein, the term "isocyanate functional groups" includes not only free isocyanate groups, but also masked, blocked or protected isocyanate groups (such as isocyanate groups that have been blocked with caprolactam, dialkyl malonate, dialkyl pyrazole or dialkyl ketoximes, wherein the blocked isocyanate groups are capable of being deblocked under the polymerization conditions used to react the halogenated reactant with the blocked polyisocyanate). Examples of suitable polyisocyanates include aliphatic, cycloaliphatic, araliphatic, aromatic and heterocyclic polyisocyanates. Examples of such polyisocyanates include those of the formula $Q(NCO)_n$, in which n is from 2 to 4, preferably 2, and Q may represent an aliphatic hydrocarbon radical having from 2 to 18 carbon atoms, preferably from 6 to 10 carbon atoms, a cycloaliphatic hydrocarbon radical having from 4 to 15 carbon atoms, preferably from 5 to 10 carbon atoms, an aromatic hydrocarbon radical having from 6 to 15 carbon atoms, preferably from 6 to 13 carbon atoms, or an araliphatic hydrocarbon radical having from 8 to 15 carbon atoms, preferably from 8 to 13 carbon atoms. Specific examples include: ethylene diisocyanate; 1,4-tetramethylene diisocyanate; 1,6-hexamethylene diisocyanate (HDI); 1,12-dodecane diisocyanate; cyclobutane-1,3-diisocyanate; cyclohexane-1,3- and -1,4-diisocyanate and any desired mixtures of those isomers; 1-isocyanato-3,3,5-trimethyl-5-isocyanatomethyl-cyclohexane; 2,4- and 2,6-hexahydrotoluene diisocyanate and any desired mixtures of those isomers; hexahydro-1,3- and -1,4-phenylene diisocyanate; perhydro-2,4'- and -4,4'-diphenylmethane diisocyanate; 1,3- and 1,4-phenylene diisocyanate; 1,4-durene diisocyanate (DM); 4,4'-stilbene diisocyanate; 3,3'-dimethyl-4,4'-biphenylene diisocyanate (TORI); 2,4- and 2,6-toluene diisocyanate (TDI) and any desired mixtures of those isomers. Also suitable are diphenylmethane-2,4'- and/or -4,4'-diisocyanate (MDI) or naphthylene-1,5-diisocyanate (NDI).

Also suitable are, for example: triphenylmethane-4,4',4''-triisocyanate, polyphenyl-polymethylene polyisocyanates, as are obtained by aniline-formaldehyde condensation and subsequent phosgenation. Also suitable are m- and p-isocyanatophenylsulfonyl isocyanates; perclilorinated aryl polyisocyanates; polyisocyanates having carbodiimide groups; norbornane diisocyanates; polyisocyanates having allophanate groups; polyisocyanates having isocyanurate groups; polyisocyanates having urethane groups; polyisocyanates having acylated urea groups; polyisocyanates having biuret groups; polyisocyanates prepared by telomerization reactions; polyisocyanates having ester groups; as well as reaction products of the above-mentioned isocyanates with acetals; and polyisocyanates containing polymeric fatty acid esters.

It is also possible to use the isocyanate-group-containing distillation residues obtained in the industrial production of isocyanates, optionally dissolved in one or more of the above-mentioned polyisocyanates. It is also possible to use any desired mixtures of the above-mentioned polyisocyanates.

Preference is given to the use of the polyisocyanates that are readily obtainable industrially, for example 2,4- and 2,6-toluene diisocyanate and any desired mixtures of those isomers (TDI); 4,4'-diphenylmethane diisocyanate, 2,4'-diphenylmethane diisocyanate, 2,2'-diphenylmethane diisocyanate and polyphenyl-polymethylene polyisocyanates, as are obtained by aniline-formaldehyde condensation and subsequent phosgenation (crude MDI); and polyisocyanates having carbodiimide groups, uretonimine groups, urethane groups, allophanate groups, isocyanurate groups, urea groups or biuret groups ("modified polyisocyanates"), especially those modified polyisocyanates which are derived from 2,4- and/or 2,6-toluene diisocyanate or from 4,4'- and/or 2,4'-diphenylmethane diisocyanate. Naphthylene-1,5-diisocyanate and mixtures of the above-mentioned polyisocyanates are also very suitable.

Suitable polyisocyanate-functionalized urethane prepolymers include prepolymers made by reacting an active hydroxyl-functionalized compound, such as a diol or diamine, with an excess of polyisocyanate so as to provide a prepolymer containing a plurality of isocyanate functional groups per prepolymer chain.

Suitable polycarboxylic acids include organic compounds containing two or more carboxylic acid functional groups (—$CO_2H$) per molecule, such as di- and/or tricarboxylic acids. The polycarboxylic acid may be aliphatic or aromatic, saturated or unsaturated. Suitable dicarboxylic acids include the straight or branched chain alpha, omega-dicarboxylic acids, such as those containing 4 to 24 carbon atoms per molecule ($C_4$ to $C_{24}$ dicarboxylic acids). Exemplary dicarboxylic acids include terephthalic acid, phthalic acid, isophthalic acid, adipic acid, succinic acid, glutaric acid, pimelic acid, suberic acid, azelaic acid, undecanedioic acid, dodecanedioic acid, tridecanedioic acid, hexadecanedioic acid, sebacic acid, diphenic acid, naphthalene dioic acid, cyclohexane-1,4-dicarboxylic acid, and the like. Tricarboxylic acids, such as benzene tricarboxylic acid, also can be employed, typically in minor amount relative to dicarboxylic acid.

Suitable polycarboxylates include esters of polycarboxylic acids, in particular esters of any of the above-mentioned polycarboxylic acids, especially lower alkyl (e.g., methyl) esters of such polycarboxylic acids.

Also suitable for use as the co-reactant in the present invention are the acyl halides of polycarboxylic acids, in particular halides of the above-mentioned polycarboxylic acids wherein the —$CO_2H$ functional groups are replaced by —C(=O)X functional groups, where X is halide (in particular Cl).

Suitable epoxy resins include organic compounds containing two or more epoxy (oxirane) functional groups per molecule. Such epoxy resins may be monomeric or oligomeric and may be composed of linear polymers which carry terminal epoxy groups, or whose backbone contains epoxy groups, or else whose backbone carries pendant epoxy groups.

Such epoxy resins may be produced from the reaction of epichlorohydrin with a bisphenol such as bisphenol A and/or bisphenol F. The epoxy resins may be alkyl and/or alkenyl glycidyl ethers or esters; optionally substituted monophenol and polyphenol polyglycidyl ethers, especially polyglycidyl ethers of bisphenol A; polyglycidyl ethers of polyols; polyglycidyl ethers of aliphatic or aromatic polycarboxylic acids; polyglycidyl esters of polycarboxylic acids; and/or polyglycidyl ethers of novolac. In a further variant, the epoxy resins may be products of the reaction of epichlorohydrin with aromatic amines or with glycidyl derivatives of aromatic monoamines or diamines; such epoxy resins are sometimes referred to as glycidyl amine epoxy resins. Cycloaliphatic epoxides may also be employed.

When reacting the halogenated reactant(s) and the co-reactant(s), one or more additional active hydrogen-functionalized reactants may be used in combination with the halogenated reactant(s) to react with the co-reactant(s). Any of the active hydrogen-functionalized reactants known in the condensation or addition polymerization art may be used for this purpose, including for example monomeric polyalcohols (e.g., glycols), polymeric/oligomeric polyalcohols (e.g., polyether polyols, polyester polyols, polyetherester polyols), polyamines and the like.

Methods of Making the Polymers

The polymers of the present invention may be prepared by contacting the halogenated reactant(s) and the co-reactant(s) for a time and at a temperature effective to effect reaction of the functional groups present in the halogenated reactant(s) with the functional groups present in the co-reactant(s) such that reactants chain-extend to form a polymer. The conditions suitable for this purpose will vary depending upon the reactivities of the different functional groups that are present. One or more catalysts may be present and/or the mixture of reactants may be heated in order to accelerate the polymerization rate. For example, where a hydroxyl-functionalized halogenated reactant is being copolymerized with an isocyanate-functionalized co-reactant to form a polyurethane, any of the catalysts known in the polyurethane art, such as tin catalysts, may be utilized. In cases where the polymerization is a condensation polymerization, the chain length of the polymer may be increased by removing the low molecular co-product(s) formed as a consequence of the reaction between the different functional groups. For example, where a hydroxyl-functionalized halogenated reactant is reacted with a polycarboxylic acid co-reactant to form a polyester or an amine-functionalized halogenated reactant is reacted with a polycarboxylic acid to form a polyamide, the water co-product may be removed from the copolymerization reaction mixture by a suitable technique such as distillation.

In certain embodiments, approximately stoichiometric amounts of the halogenated reactant(s) and the co-reactant(s) may be advantageously used. For example, where both a difunctional halogenated reactant (e.g., a halogenated reactant having two hydroxyl groups per molecule) and a difunctional co-reactant (e.g., a dicarboxylic acid) are reacted, the molar ratio of difunctional halogenated reactant and difunctional co-reactant may be from 1.5:1 to 1:1.5, or 1.4:1 to 1:1.4, or 1.3:1 to 1:1.3, or 1.2:1:1 to 1:1.2 or 1.1:1 to 1:1.1.

The addition or condensation polymerization may be carried out neat (in bulk), in solution, by means of a suspension or emulsion process or by any other technique known in the art. Once the polymerization has been carried out to the extent desired, the reaction product may be subjected to one or more further processing and/or purification steps.

Polymer End Uses

As a consequence of the halogen introduced into the polymer by incorporation of the halogenated reactant(s), the properties and characteristics may be advantageously controlled and varied. For example, the halogenation may alter one or more of the following characteristics of the polymer: fire retardancy; fingerprint resistance; surface properties (e.g., coefficient of friction, wettability, surface energy); solvent, oil, moisture, stain and/or chemical resistance; weatherability; glass transition temperature; melting point; softening point; bonding and adhesion properties; hydrophobicity; permeability; and so forth.

Polymers in accordance with the present invention may be formed or used in any manner as may be appropriate depending upon the type and characteristics of the particular polymer which is produced. Suitable methods may include, for example, extrusion, injection molding, reaction injection molding, casting, and the like. The polymers may be molded or otherwise formed into useful articles such as composites, fibers, laminates, containers, pipes, building components, vehicle components, electronic components, electrical components, appliance components, aerospace components, marine components, furniture and furnishing components, coatings, films, sheets, adhesives, sealants, packaging, fabrics, clothing articles and the like.

Polymers in accordance with the present invention may be combined or formulated together with any of the additives or additional components known in the polymer art such as, for example, other polymers (to form polymeric blends or alloys), fillers, reinforcing agents, colorants, stabilizers, plasticizers, fire retardants, antioxidants, lubricants, processing aids, adhesion promoters, nucleating agents, antistatic agents and the like.

Polymers in accordance with the present invention can be used in a wide variety of applications. For example, the polymers can be utilized as compatibilizing agents, foaming agents, surfactants, or low surface energy additives (for anti-stain, anti-soil, or anti-stick applications, for wetting or coating applications, and anti-fouling applications), to improve or enhance solvent or chemical resistance (in coatings, films, fabricated parts, etc.), in the preparation of oil and water repellant surfaces (for substrates such as plastics, textiles, paper, wood, leather, etc), as coatings for medical devices, as lubricants, as additives and bulk materials for electronic applications, as or in thermoplastic elastomers, as impact modifiers, as adhesives, for drug (or pharmaceutical) delivery, in cosmetic applications, and many others as will be evident to those skilled in the art.

Polymers (including copolymers) may be low surface energy polymers useful for modifying the surface energy of polymeric materials. These polymers can be used in additive amounts or used as bulk materials. Additive amounts may be included in a wide variety of bulk polymers to impart properties such as stain resistance that are not inherent in the bulk polymers. Potential applications include food uses, textiles, coatings, pharmaceuticals, paints, and many other industries.

The polymers provided by the present invention (including low surface energy copolymers) may be used in combination with any of the thermoplastic and thermosetting resins conventionally used in coating compositions. Of course, the specific resin or resins employed should be chosen to be appropriate for the coating application involved and should be compatible with the other components of the coating composition. Examples of useful resins include latexes, acrylic resins, vinyl acrylic resins, vinyl acetate resins, alkyd resins, polyester resins, polyurethane resins, epoxy resins, vinyl resins, phenoxy resins and the like. In the event that the final coating resin is to be a thermoset coating, the resin component includes an effective amount of a crosslinking component, e.g., at least one crosslinking agent, such as the conventionally used melamine/formaldehyde resins, urea/formaldehyde resins and the like. One or more such crosslinking agents are employed in combination with one or more other resins, referred to as thermosetting resins, in an amount effective to form crosslinks in the thermosetting resin or resins, e.g., upon the application of heat, to form the final desired thermoset surface coating.

Additionally, there exists a significant opportunity to utilize polymers in accordance with the present invention as hydrophobic additives to provide repellency characteristics to coatings, fibers and films. A key aspect of such products is that they may be added during melt processing and thereby eliminate subsequent treatment steps. The most attractive applications for such hydrophobic additives are in textiles, coatings and films, and key product attributes in these applications are anti-stain, anti-smudge, and water repellent features. Polymers in accordance with the present invention are expected to effectively function in a variety of applications involving the modification of the surface chemistry of polymeric articles. Currently, some fluorinated materials are used for such applications, but such fluorinated materials are under significant regulatory pressure to be phased out.

Areas of particular interest include, but are but not limited to: 1) repellency applications in the textile, coating and paint application, wherein the polymers in accordance with the present invention may be used for the preparation of stain and moisture repellent fibers, films, sheets, coatings and paints and the like for residential and commercial uses; 2) self-adhesive applications including release liners in particular, wherein liners are coated for label stock and graphic arts markets, i.e., for calendered kraft papers and polyethylene-coated papers, and film liners; 3) mold release agents; 4) fluorochemical surfactants; 5) printable/paintable polyolefins; 6) protective window treatments; 7) antigraffiti coatings; 8) aircraft coatings; 9) anticondensate additives; and 10) abrasion resistance additives.

Exemplary Aspects of the Invention

Various exemplary aspects of the present invention may be summarized as follows:

Aspect 1: A polymer which is an addition or condensation polymerization product of reactants comprising, consisting essentially of or consisting of:
a) at least one halogenated reactant comprising at least two active hydrogen-containing functional groups and at least one halogenated heteroalkyl or halogenated heteroalkenyl group; and b) at least one co-reactant comprising at least two functional groups reactive with the active hydrogen-containing functional groups of the at least one halogenated reactant.

Aspect 2: The polymer of Aspect 1, wherein the at least one co-reactant comprises at least two functional groups selected from the group consisting of isocyanate groups, epoxy groups, carboxylic acid groups, carboxylate groups, anhydride groups, and acyl halide groups.

Aspect 3: The polymer of Aspect 1 or 2, wherein the polymer is a polyamide, polyester, polyurea, polyurethane or epoxy polymer.

Aspect 4: The polymer of any of Aspects 1 to 3, wherein the at least one halogenated reactant comprises at least two active hydrogen-containing functional groups and at least one halogenated heteroalkyl group corresponding to formula (I):

$$CX^1X^2HCX^3X^4-Y- \quad (I)$$

wherein $X^1$, $X^2$, $X^3$ and $X^4$ are independently selected from a hydrogen atom, a halogen atom or a halogenated or non-halogenated alkyl group having 1 to 20 carbon atoms, and Y is oxygen (O), sulfur (S) or NR, where R is H or an organic moiety, subject to the proviso that the halogenated heteroalkyl group is comprised of at least one halogen atom.

Aspect 5: The polymer of Aspect 4, wherein Y is oxygen (O).

Aspect 6: The polymer of Aspect 4 or 5, wherein the halogenated heteroalkyl group is comprised of at least one fluorine atom.

Aspect 7: The polymer of any of Aspects 4 to 6, wherein the halogenated heteroalkyl group is comprised of from 2 to 4 carbon atoms.

Aspect 8: The polymer of any of Aspects 1 to 7, wherein the at least two active hydrogen-containing functional groups are selected from the group consisting of hydroxyl groups, thiol groups, secondary amino groups and primary amino groups.

Aspect 9: The polymer of any of Aspects 1 to 8, wherein the at least one co-reactant is selected from the group consisting of polyisocyanates, polyisocyanate-functionalized urethane prepolymers, polycarboxylic acids, and epoxy resins.

Aspect 10: The polymer of any of Aspects 1 to 9, wherein the at least one halogenated reactant corresponds to formula (II):

$$(R^1-Y-)_xR^2(YH)_y \quad (II)$$

wherein $R^1$ is a halogenated alkyl or halogenated alkenyl group, $R^2$ is an organic moiety, Y is oxygen (O), sulfur (S) or NR, where R is H or an organic moiety, x is an integer of 1 or more and y is an integer of 2 or more.

Aspect 11: The polymer of Aspect 10, wherein $R^1$ comprises at least one fluorine atom.

Aspect 12: The polymer of Aspect 10 or 11, wherein $R^1$ corresponds to formula (III):

$$CX^1X^2HCX^3X^4- \quad (III)$$

wherein $X^1$, $X^2$, $X^3$ and $X^4$ are independently selected from a hydrogen atom, a halogen atom or a halogenated or non-halogenated alkyl group having 1 to 20 carbon atoms, provided that at least one of $X^1$, $X^2$, $X^3$ or $X^4$ is halogen or a halogenated alkyl group.

Aspect 13: The polymer of any of Aspects 10 to 12, wherein x+y is an integer of from 3 to 6.

Aspect 14: The polymer of any of Aspects 10 to 13, wherein x is 1 and y is 2.

Aspect 15: The polymer of any of Aspects 10 to 14, wherein Y is oxygen (O).

Aspect 16: The polymer of any of Aspects 10 to 15, wherein $R^2$ is a C3-C20 aliphatic moiety.

Aspect 17: The polymer of any of Aspects 10 to 16, wherein x is 1, y is 2, Y is oxygen (O), and $R^2$ is a C3-C20 aliphatic moiety.

Aspect 18: A method for making a polymer, comprising a step of reacting at least one halogenated reactant comprising at least two active hydrogen-containing functional groups and at least one halogenated heteroalkyl or halogenated heteroalkenyl group and at least one co-reactant comprising at least two functional groups reactive with the active hydrogen groups of the at least one halogenated reactant.

Aspect 19: The method of Aspect 18, wherein the polymer is a polyamide, polyester, polyurea, polyurethane or epoxy polymer.

Aspect 20: The method of Aspect 18 or 19, wherein the at least one halogenated reactant comprises at least two active hydrogen-containing functional groups and at least one halogenated heteroalkyl group corresponding to formula (I):

  (I)

wherein $X^1$, $X^2$, $X^3$ and $X^4$ are independently selected from a hydrogen atom, a halogen atom or a halogenated or non-halogenated alkyl group having 1 to 20 carbon atoms, and Y is oxygen (O), sulfur (S) or NR, where R is H or an organic moiety, subject to the proviso that the halogenated heteroalkyl group is comprised of at least one halogen atom.

Aspect 21: An article of manufacture comprising at least one polymer in accordance with any of Aspects 1 to 17, wherein the article of manufacture is selected from the group consisting of coatings, paints, adhesives, sealants, fibers, molded articles, films, sheets, composites and laminates.

Aspect 22: Use of a polymer in accordance with any of Aspects 1 to 17 to manufacture an article selected from the group consisting of coatings, paints, adhesives, sealants, fibers, molded articles, films, sheets, composites and laminates.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the polymer or method of making the polymer. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A polymer which is an addition or condensation polymerization product of reactants comprising:
    a) at least one halogenated reactant comprising at least two active hydrogen-containing functional groups and at least one halogenated heteroalkyl or halogenated heteroalkenyl group corresponding to formula (I):

  (I)

wherein $X^1$, $X^2X^3$ and $X^4$ are independently selected from a hydrogen atom, a halogen atom or a halogenated or non-halogenated alkyl group having 1 to 20 carbon atoms, and Y is oxygen (O), sulfur (S) or NR, where R is H or an organic moiety, subject to the proviso that the halogenated heteroalkyl group is comprised of at least one halogen atom; and b) at least one co-reactant comprising at least two functional groups reactive with the active hydrogen-containing functional groups of the at least one halogenated reactant selected from the group consisting of polyisocyanates, polyisocyanate-functionalized urethane prepolymers, polycarboxylic acids, and epoxy resins.

2. The polymer of claim 1, wherein the at least one co-reactant comprises at least two functional groups selected from the group consisting of isocyanate groups, epoxy groups, carboxylic acid groups, carboxylate groups, anhydride groups, and acyl halide groups.

3. The polymer of claim 1, wherein the polymer is a polyamide, polyester, polyurea, polyurethane or epoxy polymer.

4. The polymer of claim 1, wherein Y is oxygen (O).

5. The polymer of claim 1, wherein the halogenated heteroalkyl group is comprised of at least one fluorine atom.

6. The polymer of claim 1 wherein the halogenated heteroalkyl group is comprised of from 2 to 4 carbon atoms.

7. The polymer of claim 1, wherein the at least two active hydrogen-containing functional groups are selected from the group consisting of hydroxyl groups, thiol groups, secondary amino groups and primary amino groups.

8. The polymer of claim 1, wherein the at least one halogenated reactant corresponds to formula (II):

  (II)

wherein $R^1$ is a halogenated alkyl or halogenated alkenyl group, $R^2$ is an organic moiety, Y is oxygen (O), sulfur (S) or NR, where R is H or an organic moiety, x is an integer of 1 or more and y is an integer of 2 or more.

9. The polymer of claim 8, wherein $R^1$ comprises at least one fluorine atom.

10. The polymer of claim 8, wherein $R^1$ corresponds to formula (III):

  (III)

wherein $X^1$, $X^2$, $X^3$ and $X^4$ are independently selected from a hydrogen atom, a halogen atom or a halogenated or non-halogenated alkyl group having 1 to 20 carbon atoms, provided that at least one of $X^1$, $X^2$, $X^3$ or $X^4$ is halogen or a halogenated alkyl group.

11. The polymer of claim 8, wherein x+y is an integer of from 3 to 6.

12. The polymer of claim 8, wherein x is 1 and y is 2.

13. The polymer of claim 8, wherein Y is oxygen (O).

14. The polymer of claim 8, wherein $R^2$ is a C3-C20 aliphatic moiety.

15. The polymer of claim 8, wherein x is 1, y is 2, Y is oxygen (O), and $R^2$ is a C3-C20 aliphatic moiety.

16. A method for making a polymer, comprising a step of reacting at least one halogenated reactant comprising at least two active hydrogen-containing functional groups and at least one halogenated heteroalkyl or halogenated heteroalkenyl group corresponding to formula (I):

  (I)

wherein $X^1$, $X^2$ $X^3$ and $X^4$ are independently selected from a hydrogen atom, a halogen atom or a halogenated or non-halogenated alkyl group having 1 to 20 carbon atoms, and Y is oxygen (O), sulfur (S) or NR, where R is H or an organic moiety, subject to the proviso that the halogenated heteroalkyl group is comprised of at least one halogen atom and at least one co-reactant comprising at least two functional groups reactive with the active hydrogen groups of the at least one halogenated reactant selected from the group consisting of polyisocyanates, polyisocyanate-functionalized urethane prepolymers, polycarboxylic acids, and epoxy resins.

17. The method of claim 16, wherein the polymer is a polyamide, polyester, polyurea, polyurethane or epoxy polymer.

18. An article of manufacture comprising at least one polymer in accordance with claim 1, wherein the article of manufacture is selected from the group consisting of coatings, paints, adhesives, sealants, fibers, molded articles, films, sheets, composites and laminates.

* * * * *